United States Patent

Lewis

[11] 4,041,694
[45] Aug. 16, 1977

[54] COMBUSTION TEMPERATURE CONTROL

[75] Inventor: George D. Lewis, North Palm Beach, Fla.

[73] Assignee: United Technologies Corporation, Hartford, Conn.

[21] Appl. No.: 607,651

[22] Filed: Aug. 25, 1975

[51] Int. Cl.² .............................................. F02C 9/08
[52] U.S. Cl. ............................. 60/39.02; 60/39.28 T; 60/39.27; 60/39.29; 431/12
[58] Field of Search ................... 60/39.28 T, 39.28 R, 60/39.27; 137/4, 6, 90; 431/12; 73/25, 26

[56] References Cited

U.S. PATENT DOCUMENTS

| | | | |
|---|---|---|---|
| 2,606,420 | 8/1952 | Moore | 60/39.27 X |
| 3,245,219 | 4/1966 | Warden | 60/39.28 R |
| 3,403,509 | 10/1968 | Eastman | 60/39.28 R |
| 3,416,310 | 12/1968 | Boothe | 60/39.28 R |
| 3,590,653 | 7/1971 | Dreckmann | 60/39.27 |
| 3,651,639 | 3/1972 | Black | 60/39.28 T |
| 3,769,792 | 11/1973 | Grey | 60/39.28 T |
| 3,893,291 | 7/1975 | Davis | 60/39.28 T |
| 3,899,878 | 8/1975 | Compton | 60/39.28 T |
| 3,899,886 | 8/1975 | Swick | 60/39.27 X |
| 3,938,319 | 2/1976 | Thomson | 60/39.28 R |

Primary Examiner—Clarence R. Gordon
Attorney, Agent, or Firm—Jack N. McCarthy

[57] ABSTRACT

In order to maintain local flame temperatures in a gas turbine engine combustor lower than 3200° F. to prevent excessive formation of nitrogen oxides and above 2500° F. to prevent excessive carbon monoxide formation and flameout, it is desirable to measure the flame temperature at a number of points within the combustor. Appropriate volumes of cool air entering the burner and hot gas in the flame vicinity are withdrawn and mixed to produce a gas mixture at a temperature low enough to be measured by conventional means such as thermocouples. The volume of each gas withdrawn is controlled by flow through a choked orifice. The pressure differential between the combustor pressure and ambient pressure is used to choke the flow control orifices.

10 Claims, 9 Drawing Figures

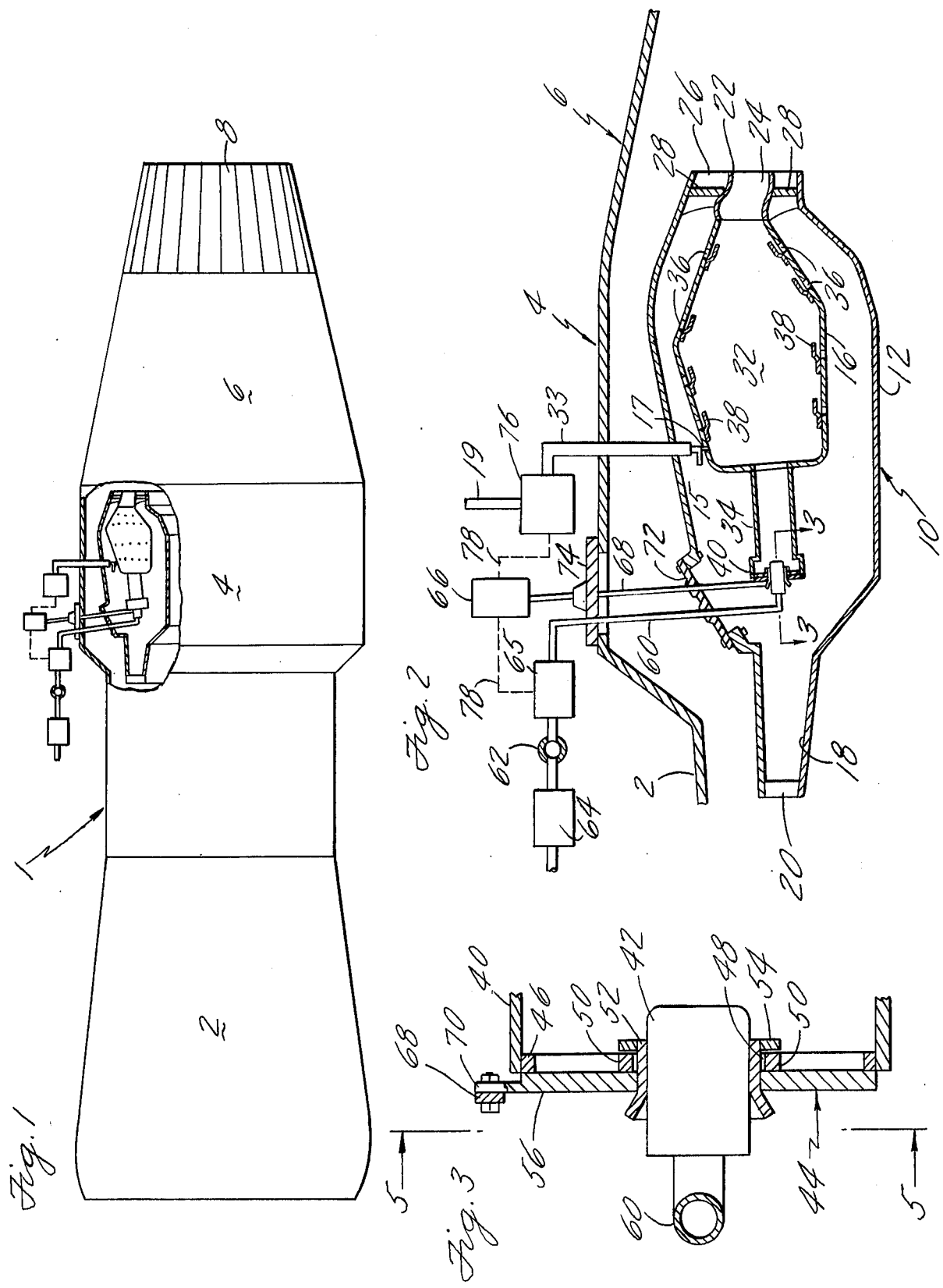

_COMBUSTION TEMPERATURE CONTROL_

BACKGROUND OF THE INVENTION

Substantial amounts of the oxides of nitrogen are formed in a turbine engine combustor when the flame temperature in any region exceeds about 3200° F. In addition, excessive carbon monoxide is discharged if the local flame temperature falls below about 2500° F. To reduce these noxious emissions to acceptable levels, it is desirable to operate the combustor in such a manner that the flame temperature does not exceed 3200° F. or fall below 2500° F. at any point. This can be accomplished by vaporizing the fuel before it is burned and adjusting the fuel-air ratio at each point in the burner so that the flame temperature does not exceed the limits. Unfortunately, the distribution of air leaving the compressor of a typical turbine engine is not uniform and flowrate varies substantially from point to point. In some engines, this variation exceeds 50% of the mean airflow. Moreover, the nonuniformity of the airflow changes with both changing engine operating conditions and the wear of engine compressor seals. Therefore, in order to prevent the local flame temperature from exceeding 3200° F. on the high side or falling below the limit of about 2500° F. on the low side as the local airflow changes, it is desirable to measure the flame temperature and adjust either the airflow or the fuel flow in each local region of measurement to maintain the desired flame temperature.

Again it is unfortunate that the flame temperature which is 3200° F. during steady state operation and may exceed 4000° F. during transients is above the practical operating range of most durable, immersion-type temperature sensors such as thermocouples. Some pseudo-temperature sensors operate on the basis of measuring a heat transfer rate from which a gas temperature is calculated. Because of the wide variations in heat transfer rate which occur with changes in engine operating condition, aircraft altitude and aircraft flight velocity, this type of sensor is inadequate for aircraft turbine engines.

SUMMARY OF THE INVENTION

A primary object of the present invention is to provide a means of sensing a local flame temperature and providing a signal that can be used to adjust the local airflow or local fuel flow to maintain the flame temperature between the limits of 2500° F. and 3200° F. at engine and aircraft operating conditions.

In accordance with the present invention, a plurality of vaporization tubes are used to deliver fuel-air ratio to the combustion chamber while means are provided to control airflow or fuel flow to said tube for delivery to said combustion chamber, as a result of obtaining a signal from the local flame temperature in said combustion chamber.

In accordance with a further aspect of the present invention, a control device is used to achieve the desired fuel-air ratio at one particular hot location with the control device being actuated by a sensing means which senses a temperature in a chamber to which a fluid is bled from the hot zone and from a cooler compressor discharge airflow.

BRIEF DESCRIPTION OF THE DRAWINGS

FIG. 1 is a view of a gas turbine engine showing the location of the burner means and temperature control means for combustion therein.

FIG. 2 is an enlarged sectional view of the combustion section showing the burner means and cooperating control means.

FIG. 3 is an enlarged view of an air control valve and a fuel nozzle taken along the line 3—3 of FIG. 2.

DESCRIPTION OF THE PREFERRED EMBODIMENT

Figure 4:
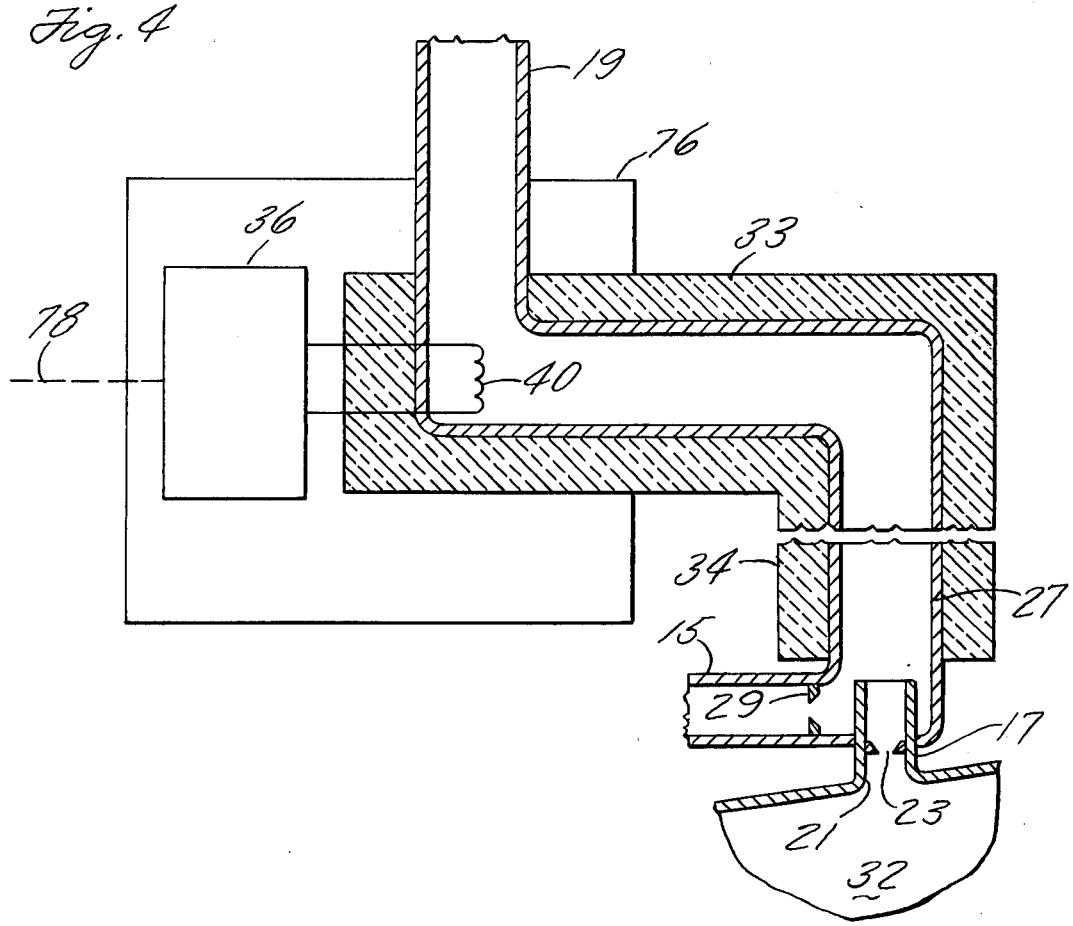
FIG. 4 is an enlarged view of the temperature control means including a temperature sensor.
Figure 5:
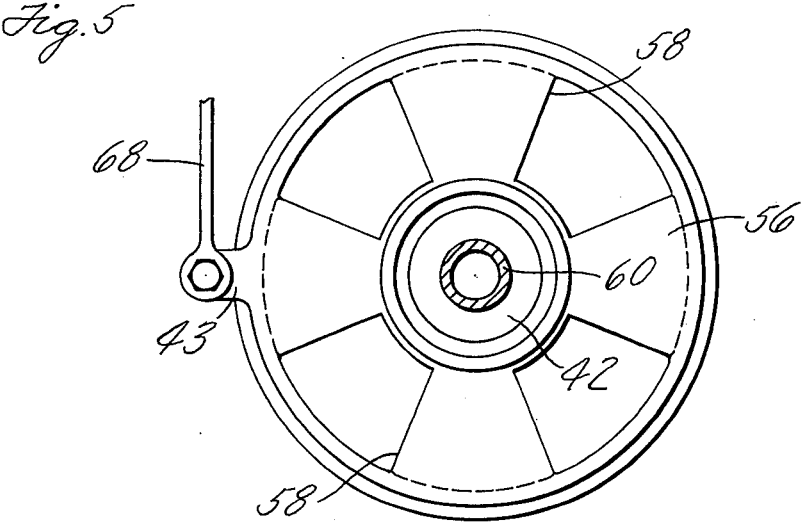
FIG. 5 is a view taken along the line 5—5 of FIG. 3.

Referring to FIG. 1, a gas turbine powerplant is shown indicated generally by 1. The powerplant has a compressor section 2, a combustion section 4, a turbine section 6 and an exhaust section 8. The combustion section 4 is comprised of an annular burner casing 10 formed of an inner wall 12 and an outer wall 14 with a plurality of burner cans 16 located therein. While burner cans have been shown and described, the burner construction can be formed having an annular configuration extending within the annular burner casing 10.

Air enters the annular burner casing 10 of the combustion section 4 from annular passage 18 which directs air from compressor exit guide vanes 20 to the upstream end of the annular burner casing 10. The downstream end of each of the burner cans 16 are connected to an annular duct 22 containing a plurality of turbine inlet guide vanes 24 which defines a flow passage for gases leaving the burner cans 16, or annular burner (not shown) with the vanes imparting a desired direction and velocity thereto. Structural ribs 20 support the annular duct 22 at the rear end of the annular burner casing 10 with web means 28 being located between the ribs to prevent air from bypassing the burner cans 16 and passing to the turbine section 6. The outer wall 14 of the burner casing 10 has a removable plate 72 thereon for each burner can 16 for a purpose to be hereinafter described. While no specific means are shown for mounting each of the burner cans 16 within the annular burner casing 10, any known support means can be used.

Each burner can 16 encloses a combustion zone 32. Primary air and fuel enters each burner can 16 at the center of the forward end through a cooperating vaporization tube 34. The air from the compressor which is permitted to flow around the burner can 16 flows through holes 36 and impinges on louvers 38 located on the interior surface of the burner cans 16. These louvers divert the air to a direction more nearly parallel to the burner walls for the purpose of cooling them. Additional air may flow through burner dilution holes (not shown) or may be diverted for turbine cooling or other purposes.

Each vaporization tube 34 has an enlarged section 40 at its forward end. This enlarged section 40 provides for positioning a fuel nozzle 42 and mounting an air control valve 44. Each enlarged section 40 has an air control valve 44 located at the forward end thereof including a flat plate 46 fixed thereto. Said flat plate has a central opening 48 with equally spaced openings 50 located therearound. The opening 48 has a sleeve 52 positioned therein for rotation with a small flange 54 located thereon within the enlarged portion 40 of the vaporization tube 34 and a large control flange 56 connected thereto adjacent the forward surface of the plate 46. This construction permits the flange 56 to rotate in relation to the fixed plate 46. The rotating flange 56 has openings 58 which correspond to the openings 50 in the annular flat plate 46 and rotation of the flange 56 will move it in relation to the plate 46 to vary the position of the openings 50 and 58 to each other so as to vary the area of the openings across said two plates 46, 56 from a predetermined maximum to a predetermined minimum to control airflow therethrough.

Fuel is added to the airflow passing through the opened area between the plates 46 and 56 by fuel nozzles 42. Fuel is supplied to each nozzle 42, one for each vaporization tube 34, by a fuel conduit 60 which extends inwardly from a fuel control valve 65. Fuel is directed to each valve 65 through a manifold 62 by a conventional fuel supply and metering control 64.

Control means 66 are provided to rotate the plate 56 to control the aligned area of the openings across the two plates 46 and 56. The control means 66 is formed having a rod 68 connected to a tab 43 extending from the periphery of the flange 56. It can be seen that as the rod 68 is moved in and out of the burner casing 10 it will rotate the flange 56 to accomplish this desired purpose. It is noted that conduit 60 and rod 68 extend through a removable plate 72 on the burner casing 10 and a removable plate 74 on the outer wall of the combustion section 4. This is to facilitate access to the interior of the combustion section 4 and burner casing 10.

Figure 8:
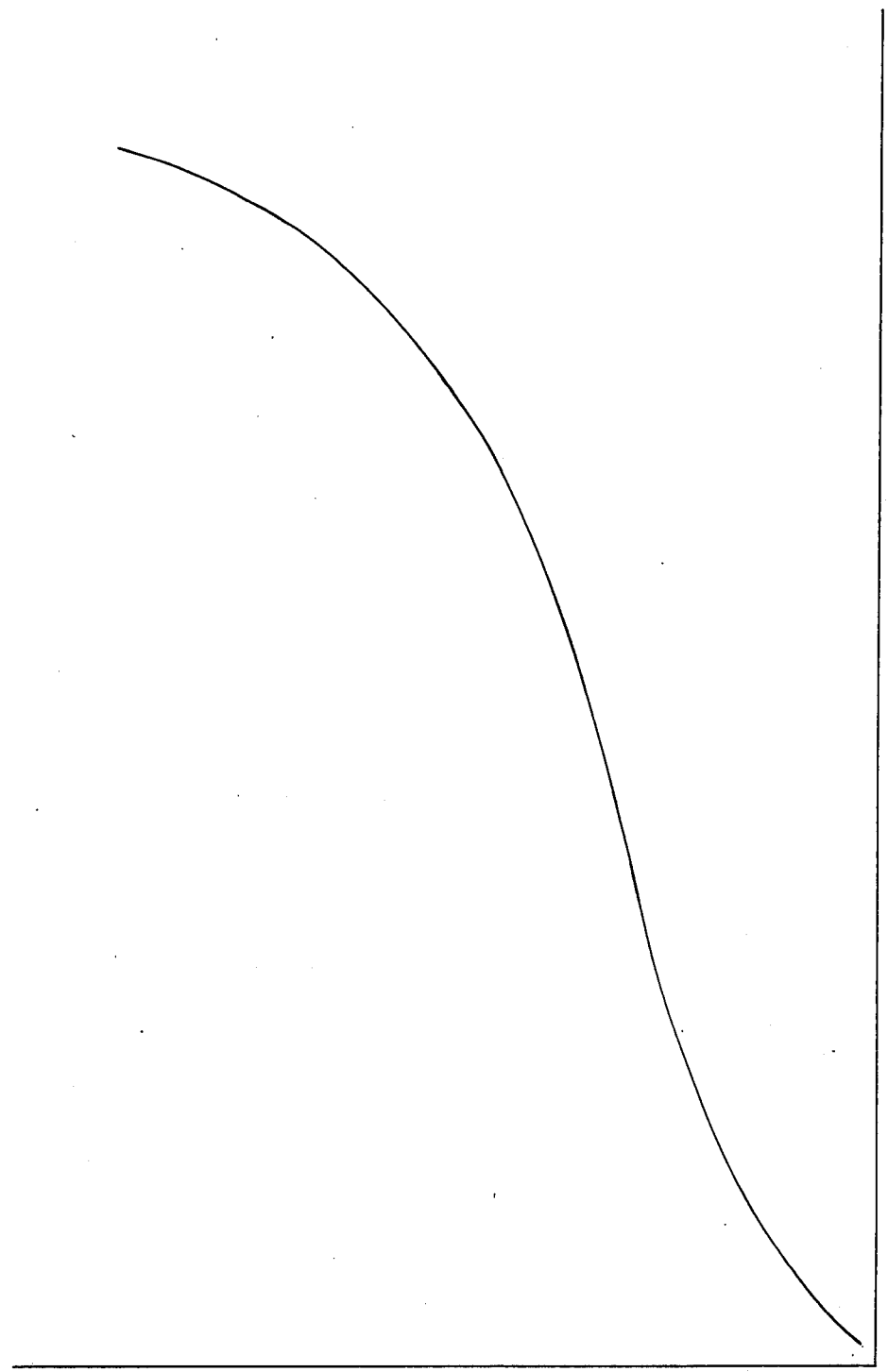
FIG. 8 is a chart showing a predetermined schedule relating sensing element temperature to air valve flow area.
Figure 9:
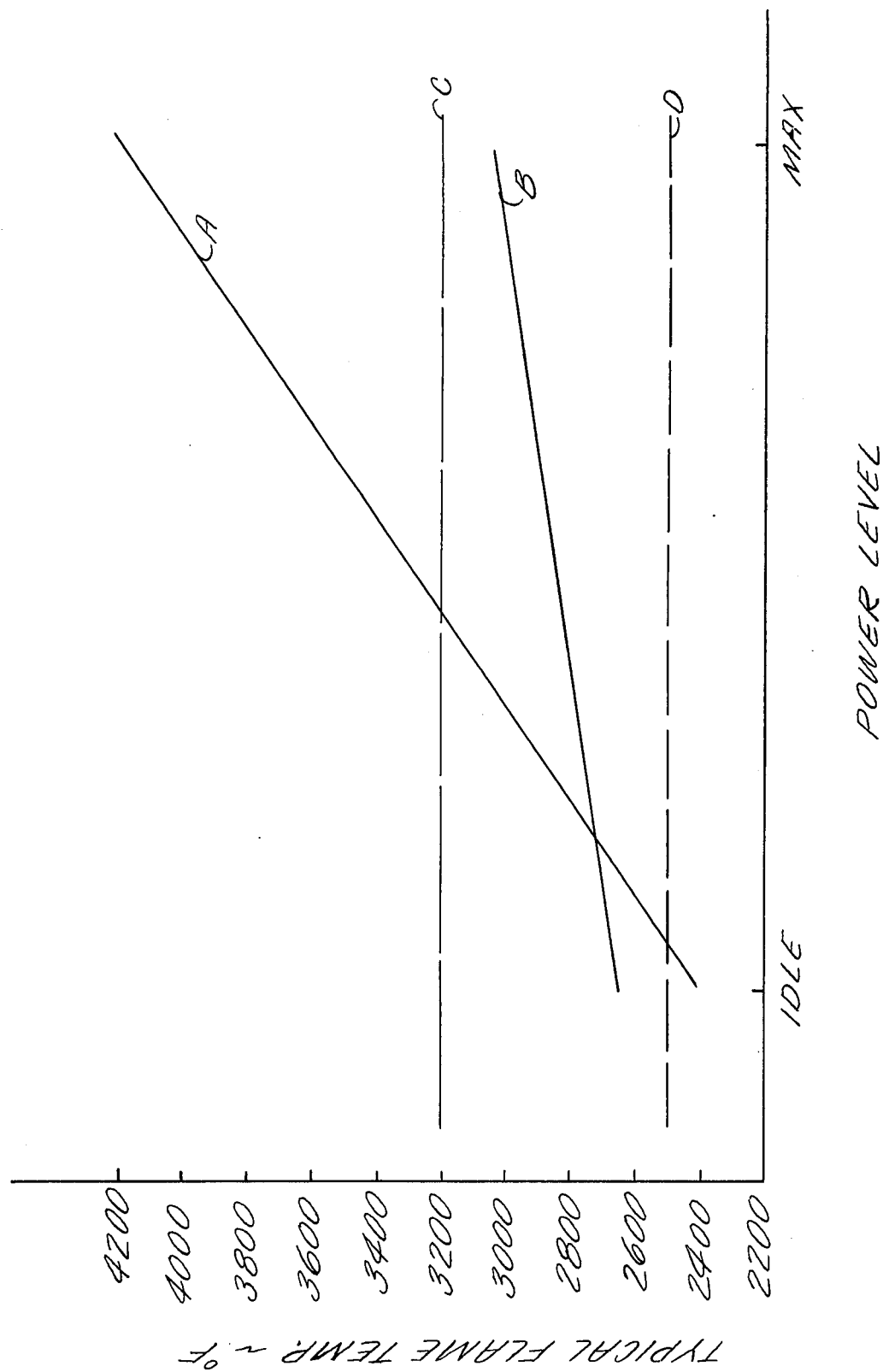
FIG. 9 is a chart showing the typical flame temperature changes with respect to power level by line A while a desired change is shown by line B.

For normal operation at a given power level the engine operates at a position of flanges 56 and temperature at 25 which places a specific open area of the openings across the plates 46 and flanges 56 of each of the vaporization tubes 34 in accordance with predetermined schedule such as shown typically in FIG. 8. The fuel control 64 will operate as a conventional fuel regulating device providing the proper amount of total fuel to the engine in response to the position of the power lever. For a conventional burner can not employing the principles of this invention, the flame temperature of a typical turbine engine changes over a wide range as the power level is changed as shown by line A in FIG. 9. At the idle power level, the flame temperature is below 2500° F. and large amounts of carbon monoxide are emitted. At maximum power, the temperature in the flame region of the burner can approached 4200° F. and large amounts of nitrogen oxides are formed. If the flame temperature is held within the limits of 3200° F. and 2500° F., as shown by the dashed lines C&D in FIG. 9, only small amounts of polluting emissions will be generated. The flame temperature can be held within these limits by increasing the airflow to the front end of the burner when the total fuel flow is increased and reducing the airflow to the front end of the burner when the total fuel flow is reduced in response to changes in power level. The proportion of the total burner airflow that enters the front end of a burner can through air valve 44 is determined by the ratio of the flow passage area in valve 44 to the sum of all the flow passage areas in the burner can, including cooling holes 36 and dilution holes (not shown). Thus, the proportion of air entering the front of the burner can, can be directly controlled by controlling the flow passage area in air valve 44. The proportion of the total fuel flow which passes through each fuel nozzle is determined by the ratio of the flow passage area of the fuel distribution valve 65 connected to that nozzle to the sum of the flow areas of all the valves 65. Thus, the proportion of the total fuel flow provided to each burner can, can be controlled by controlling the flow passage areas in fuel distribution valves 65. This results in a typical variation of flame temperature as a function of power level as shown by line B in FIG. 9.

A control device 76 is connected to each air control means 66 and fuel control valve 65 to achieve the desired fuel-air ratio in that burner can. The control device 76 is connected to the control means 66 and fuel control valve 65 by a linkage 78. This linkage is arranged to adjust either the area of the openings across the two plates 46 and 56 of the air control valve, or the fuel distribution valve 65, or both.

To provide a control signal for the control device 76 to actuate the air control valve 44 and fuel distribution valve 65, compressor discharge air from passage 18 enters pipe 15 which communicates with that passage and simultaneously hot combustion products enter pipe 17 which communicates with combustion zone 32. Additional details are shown in FIG. 4 which is an enlargement of the gas sampling and mixing system.

In FIG. 4, pipe 17 communicates with combustion zone 32 through hole 21 in the wall of the burner can 16. An orifice 23 restricts the flow of hot gas from combustion zone 32 into mixing passage 25 formed by tube wall 27. Additional cooler compressor discharge air flows through pipe 15 into mixing zone or passage 25. Flow through pipe 15 is restricted by orifice 29. Tube 27 communicates with pipe 19 which may communicate with the engine exhaust gas downstream of the turbine, or with ambient air outside of the engine or with any other place where the pressure is sufficiently lower than the pressure in combustion zone 32 and passage 18 to assure that both orifices 23 and 29 are choked, that is, have a pressure ratio across them greater than the minimum necessary to produce sonic velocity at their minimum flow areas.

The gas flows through orifices 29 and 23 will mix in passage 25 to produce a gas temperature that can be expressed by equation A with less than about 2% error.

Equation A $$T_{25} = \frac{A_{23}[T_{32}]^{\frac{1}{2}} + A_{29}[T_{18}]^{\frac{1}{2}}}{\frac{A_{29}}{[T_{18}]^{\frac{1}{2}}} + \frac{A_{23}}{[T_{32}]^{\frac{1}{2}}}}$$

where $T_{25}$ is the temperature of the mixed gases in passage 25, $A_{23}$ is the effective flow area of orifice 23, $A_{29}$ is the effective flow area of orifice 29, $T_{32}$ is the temperature of the gas in combustion zone 32, and $T_{18}$ is the temperature of the compressor discharge air in passage 18.

Equation A defines a fixed relationship between $T_{25}$ and the flame temperature $T_{32}$ for any given value of $T_{18}$. In a gas turbine engine, temperature $T_{18}$ only varies slightly, primarily as a function of inlet air temperature, at any given power lever angle. Therefore $T_{25}$ is an excellent measure of flame zone temperature $T_{32}$.

Figure 6:
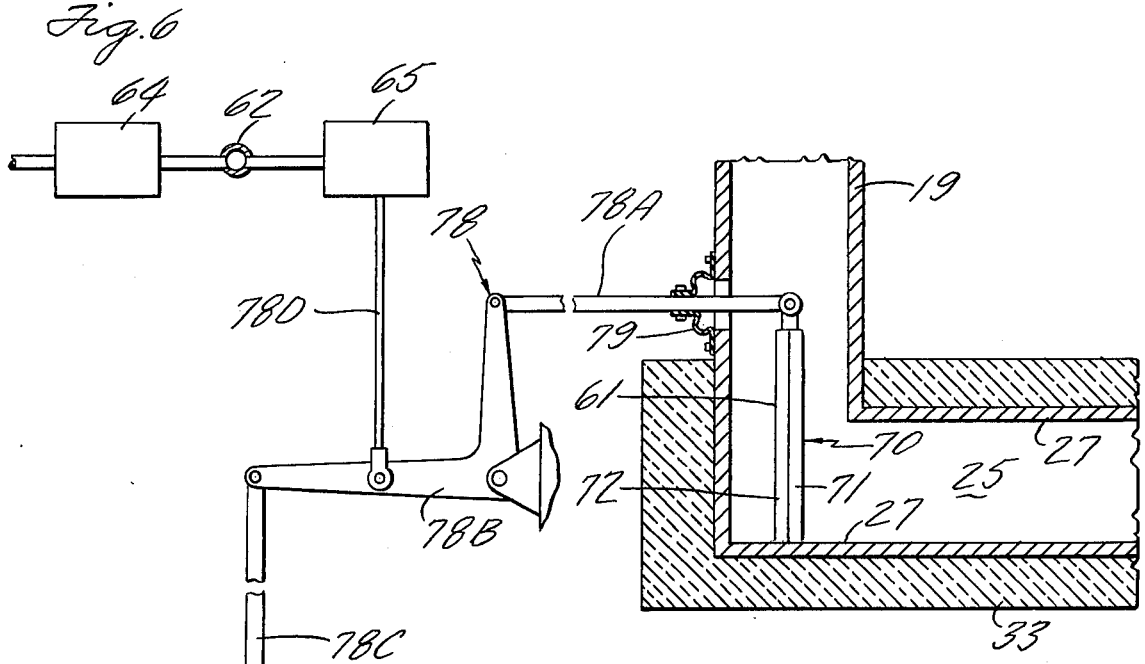
FIG. 6 is an enlarged view of a portion of the temperature control means showing a modified temperature sensor and a view of the air control valve.
Figure 7:
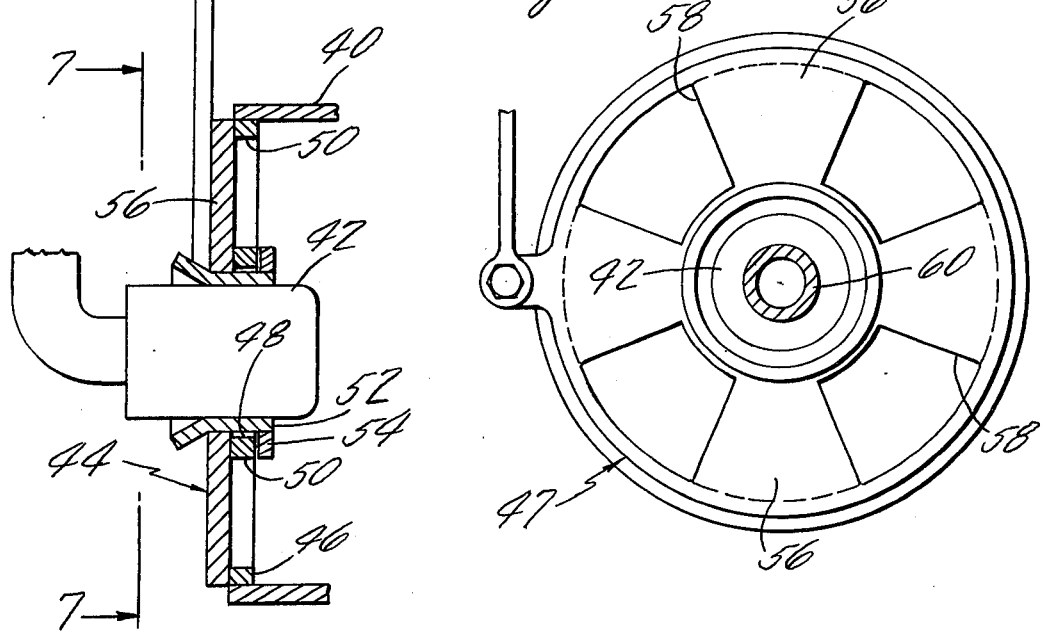
FIG. 7 is a view taken along the line 7—7 of FIG. 6.

Near the discharge end of passage 25 where it communicates with discharge pipe 19, is located a temperature sensor 40 to sense the temperature $T_{25}$. This sensor may be any type such as a thermocouple, a gas bulb, a bimetallic element or other. In FIG. 6, a bimetallic element is shown. Insulation 33 surrounds tube 27 and flow passage 25 to prevent appreciable loss of heat to the surroundings before $T_{25}$ is measured.

In FIG. 6, one possible configuration of air control valve 44 is shown in detail together with a bimetallic temperature sensing element and linkage 78.

It is obvious to anyone skilled in the art that the shapes of the flow passages in the shutters and the linkage 78 can be adjusted to provide any desired degree of change in air or fuel flow passage area for a given rotation of ear 43 by bimetallic element 70.

To provide motion to linkage 78 in response to changes in temperature $T_{25}$, a bimetallic element 70 is attached to tube wall 27 extending into flow passage 25. The bimetallic element 70 is composed of two metals 71 and 72 having dissimilar coefficients of thermal expansion such as iron and copper. The two metals are joined together by brazing, welding or other means along their interface 61. Changes in the temperature of the element will cause one metal to expand or contract more than the other thus making the element bend and move linkage 78 an amount that is proportional to the change in temperature. Movement of the linkage 78 including input rod 78A, bellcrank lever 78B and output rods 78C and 78D, changes the flow passage areas in air valves 44 and in fuel distribution valves 65. A flexible seal 79 is located between the rod 78A and pipe 19. The length of the arms of the bellcrank lever 78B and the location of the connection of the output rods 78C and 78D to the lever 78B varies their movement with respect to input rod 78A. Force assist devices can be used along the linkage 78 where needed or desired.

Changing the flow passage area in air valves 44 changes the proportion of the burner air that enters the front end of the burner cans. If, for example, the change in temperature was produced by a change in total fuel flow in response to a movement in the engine power lever, the change in burner can airflow distribution would be in proportion to the change in fuel flow. If the airflow distribution among cans in the engine is uniform, equal movement of all of the fuel distribution valves 65 does not affect the fuel distribution among cans but only produces an equal change in pressure drop in the system supplying each one. If, for example, the airflow to one burner can is less than the others, causing it to operate at a higher fuel-to-air ratio and hence a higher flame temperature, the bimetallic sensing element associated with that can will feel a higher temperature and will bend more than the others causing its air valve 44 to move further open to provide more air and its fuel distribution valve 65 to move further closed to divert some of its fuel to the other burner cans, thus bringing the flame temperature of that can close to the flame temperature in the other burner cans.

I claim:

1. A flame temperature control system for a gas turbine engine having a combustion chamber, air inlet means, combustion chamber gas discharge means, and fuel injection means, including combustion chamber inlet air sampling means, combustion chamber hot gas sampling means, said inlet air sampling means including a first fixed area orifice for continuously directing a sample flow of inlet air therethrough, said hot gas sampling means including a second fixed area orifice for continuously directing a sample flow of hot gas therethrough, means for receiving said sample flows from said sampling means and directly mixing the samples, means for detecting the temperature of the mixed gases, and means for adjusting the fuel-air ratio in said combustion chamber in response to the detected temperature to maintain a desired temperature in said combustion chamber.

2. A temperature control system as set forth in claim 1 in which the combustion chamber is annular in construction.

3. A temperature control system as set forth in claim 1 in which the combustion chamber is formed as a plurality of individual burner cans.

4. A temperature control system as set forth in claim 1 in which the fuel flow is changed to adjust the local fuel-air ratio.

5. A temperature control system as set forth in claim 1 in which the air flow is changed to adjust the local fuel-air ratio.

6. A temperature control system as set forth in claim 1 in which both the fuel and the air are changed to adjust the local fuel air ratio.

7. A control system as set forth in claim 1 in which the total fuel flow to the combustor is held constant while the local fuel flow at individual points in the combustor is adjusted in response to local variations in flame temperature.

8. A control system as set forth in claim 1 in which the total airflow to the combustor is held constant while the local airflow at individual points in the combustor is adjusted in response to local variations in flame temperature.

9. A control system as set forth in claim 1 in which both the total fuel flow and total airflow to a combustor are held constant while both the local fuel flow and local airflow are adjusted in response to local variations in flame temperature.

10. A method of maintaining a desired temperature in a combustion chamber comprising the steps of:
   1. selecting a desired temperature for a combustion chamber;
   2. taking a continuous sample of combustion chamber cold gas through a fixed area orifice;
   3. taking a continuous sample of combustion chamber hot gas through a fixed area orifice,
   4. directly mixing the two gas samples,
   5. taking the resultant temperature of the mixed gas samples,
   6. controlling the fuel-air ratio in said combustion chamber in response to the temperature of the mixed gas samples to maintain said selected temperature in said combustion chamber.

* * * * *